United States Patent [19]

Bresalier et al.

[11] Patent Number: 5,513,181
[45] Date of Patent: Apr. 30, 1996

[54] MULTI-SIGNAL MULTI-CODER TRANSCODER

[75] Inventors: Robert D. Bresalier, Parsippany; Robert C. Fairfield, Randolph; Kevin Loughran, Randolph Township, Morris County, all of N.J.

[73] Assignee: AT&T Corp., Murray Hill, N.J.

[21] Appl. No.: 390,333

[22] Filed: Feb. 17, 1995

[51] Int. Cl.⁶ .................................................. H04J 3/02
[52] U.S. Cl. .......................... 370/79; 370/109; 370/118
[58] Field of Search ........................... 370/68.1, 49.5, 370/79, 84, 95.1, 95.3, 109, 110.1, 112, 118; 341/50, 51, 61, 89

[56] References Cited

U.S. PATENT DOCUMENTS

| | | | |
|---|---|---|---|
| 5,121,391 | 6/1992 | Paneth et al. | 370/109 |
| 5,436,900 | 7/1995 | Hammar et al. | 370/83 |
| 5,438,569 | 8/1995 | Kapadia et al. | 370/95.1 |

Primary Examiner—Douglas W. Olms
Assistant Examiner—Min Jung
Attorney, Agent, or Firm—Jason P. DeMont

[57] ABSTRACT

A multi-signal multi-coder transcoder is disclosed for communications systems that can be fabricated less expensively than embodiments in the prior art and without requiring significant changes to the signal source and destination devices. An illustrative embodiment preferably comprises an input lead, an output lead, an input switch, an output switch, a pool of N processing elements, which are configured to perform a first coding technique and a pool of M processing elements, which are configured to perform a second coding technique, or possibly both techniques. When the input lead carries a plurality of multiplexed signals, each of which is to be transcoded in accordance with one of the two coding techniques, the input switch segregates and routes the incoming signals to an appropriate processing element. While a processing element is preferably configured to perform only one coding technique, each is preferably capable of transcoding multiple signals concurrently in accordance with that technique. The output switch gathers the respective transcoded signals, re-multiplexes them and transmits them on the output lead.

12 Claims, 4 Drawing Sheets

(PRIOR ART) (HALF DUPLEX)

(PRIOR ART) (HALF DUPLEX)

(PRIOR ART) (HALF DUPLEX)

(PRIOR ART) (HALF-DUPLEX)

(PRIOR ART) (HALF-DUPLEX)

(HALF-DUPLEX ARCHITECTURE)

MULTI-SIGNAL MULTI-CODER TRANSCODER

FIELD OF THE INVENTION

The present invention relates to telecommunications systems in general, and, more particularly, to a method and apparatus for transcoding (e.g., compressing, decompressing, encrypting, decrypting, error encoding, error detecting, error correcting, etc.) each of the communication signals in a multiplexed communication channel with one of two or more disparate coding techniques.

BACKGROUND OF THE INVENTION

As shown in FIG. 1, communication signals (e.g., audio signals, video signals, data, etc.) are often transcoded en route from a source device (e.g., a mobile switching center in a wireless communications system) to a destination device (e.g., a base station controller in that wireless communication system). For the purposes of this specification, the term "transcode" is defined to include encoding and/or decoding with respect to data compression, cryptography and/or error detection and correction.

Typically, the communications link connecting the source device to the destination device transports multiple communication signals. When multiple communication signals are to be transcoded en route, a transcoding bank is usually interposed in the communications link between the source and destination devices. Typically, all of the communication signals in the link are transcoded with the same coding technique and, therefore, the transcoding bank comprises multiple coders, one per communication signal, that are each configured to transcode in accordance with the appropriate coding technique.

There are systems, however, where some of the communication signals in the link are to be transcoded with one coding technique while other communication signals, which are multiplexed in the same communication link, are to be transcoded with a second coding technique. One example of such an system is the Global System for Mobile Communications ("GSM"). In GSM, the mobile switching center transmits multiple 64 kbps audio signals to the base station controller which, however, expects to receive, not the 64 kbps audio signals that were transmitted, but either compressed 16 kbps audio signals in some cases and more highly compressed 8 kbps audio signals in others. To effect this conversion, a multi-coder transcoding bank is needed that can transcode those audio signals that need transcoding from 64 kbps to 16 kbps (and vice versa) and the other signals that need transcoding from 64 kbps to 8 kbps (and vice versa).

FIG. 2 depicts a block diagram of a half-duplex multi-coder transcoding bank 203 that is interposed between a source and destination device. For pedagogical reasons, the signal flow is shown going in one direction only. It will be clear to those skilled in the art that a full-duplex architecture can be designed based on a combination of the half-duplex architecture and the mirror image of the half-duplex architecture, but with the relevant signaling coming from either one or both of the source and destination devices.

FIG. 3 depicts a block diagram of the typical architecture of multi-coder transcoding bank 203. Multi-coder transcoding bank 203 comprises demultiplexor 301, which demultiplexes the incoming communication signals and distributes them to the respective multicoder processing elements, one communication signal per processing element, for transcoding, and multiplexor 303, which re-multiplexes the transcoded communication signals for transmission to the destination device. According to this architecture, each processing element is configured to be capable of transcoding one communication signal according to whichever coding technique is appropriate, hence the name multi-coder processing element. For example, in terms of the GSM system described above, each processing element is preferably configured to be capable of compressing one 64 kbps audio signal to either 16 kbps or 8 kbps. In this architecture the demultiplexing operation, and the corresponding multiplexing operation, is simple because the demultiplexor always parcels out exactly one communication signal to each processing element. Furthermore, the demultiplexing operation, and corresponding demultiplexing operation, is static because a communication signal can always be routed to the same processing element, regardless of whether the coding technique to be applied to the communication signal changes.

Because the communication signal input to each multi-coder processing element may require processing by any of the supported coding techniques, each processing element must be capable of:

(1) discerning the required coding technique to be applied in a particular instance, either by examining the communication signal itself, in the case of in-band signaling, or under the direction of a controller (not shown) that is guided by out-of-band signaling; and (2) supporting all of the germane transcoding techniques, which requires that the processing element have the computational power to support the most computationally intense of the various transcoding techniques.

The architecture of FIG. 3 is advantageous because neither the source device nor the destination device need know which coding technique is to be applied to a given signal. Nor do the source or destination device need to be concerned with the routing of individual communication signals to the correct transcoding bank to effectuate the transcoding required for that signal.

The architecture of FIG. 3 is disadvantageous, however, when the supported coding techniques have significantly disparate computational complexities (i.e., require different amounts of cycles to perform). In such a case, when a multi-coder processing element is processing the less complex coding technique, the processing element is significantly under-utilized. Furthermore, when a system has only a small proportion of communication signals that require the more complex coding technique, then the transcoder bank is greatly over-engineered, and, therefore, probably more expensive than necessary.

FIG. 4 depicts another architecture that supports multi-coder transcoding. According to this architecture, multiple single-coder transcoding banks are used which each support one of the germane coding techniques. According to this architecture, however, the source device cannot transmit all of the communications signals over a single link, but must be responsible for directing all of the communication signals requiring one coding technique to one transcoder bank and for directing those signals requiring the alternative coding technique to the other transcoding bank. When the source device is extant and not designed to perform this distribution function, this architecture is disadvantageous because it requires significant redesign of the source device and/or destination device to handle the distribution function.

FIG. 5 depicts a block diagram of the salient components of type #1 single-coder transcoding bank 405, which comprises: demultiplexor 501, which demultiplexes the incoming communication signals and distributes them to the respective single-coder processing elements for transcoding, and multiplexor 503, which re-multiplexes all of the transcoded communication signals for transmission to the destination device. Type #2 single-coder transcoding bank 407 is fabricated analogously to the type #1 single-coder transcoding bank 405. According to this architecture, each processing element is configured to be capable of transcoding a communication signal according to only one coding technique, hence the name single-coder processing element. In this architecture the demultiplexing operation is simple, static and straight-forward because each processing element is capable of processing each communication signal.

The architecture of FIG. 5 is advantageous because each of the processing elements are configured identically to perform the same coding technique. There are, however, a number of shortcomings to this approach. The source must provide a segregation function to ensure that the signals are routed to the appropriate transcoding bank, and that the destination be aware of multiple transcoding banks as its input. Additionally, in typical cases, the source and destination devices perform different functions in the management of system operation. For example, in GSM systems, the mobile switching center chooses the channel in which each communication signal is to be transported but the base station controller chooses which coding technique is to be applied to each communication channel. Therefore, it is the source and destination devices must be synchronized in terms of signal routing management and coding technique. This mandates the redesign of the source and destination devices and the addition of a communication link between them that was not required previously.

SUMMARY OF THE INVENTION

Embodiments of the present invention are capable of transcoding a plurality of multiplexed communication signals with alternative coding techniques while avoiding many of the costs and restrictions associated with techniques in the prior art. Specifically, embodiments of the present invention can be fabricated which require only nominal changes to the communication signal source and destination devices and that are more efficient in harnessing the processing power inherent in the embodiment. This last advantage enables embodiments of present invention to be fabricated that are significantly less expensive than embodiments in the prior art.

An illustrative embodiment of the present invention receives multiple, multiplexed communication signals, demultiplexes them, and then segregates and routes each communication signal to a given processing element based on the type of transcoding required for the signal. The embodiment preferably comprises two pools of processing elements. Each processing element in the first pool is preferably configured to perform one coding technique, but on one or more communications signals concurrently. Each processing element in the second pool is preferably configured to perform either only the alternative coding technique, or both coding techniques, on one or more signals, concurrently. By knowing which signals require which coding technique, the illustrative embodiment, by using pooling theory and dynamic resource allocation, can route each signal to an appropriate processing element for transcoding. The result is a multi-signal multi-coder transcoder bank that, on average requires fewer processing elements overall, or less expensive processing elements, than in the prior art.

DETAILED DESCRIPTION

Figure 6:
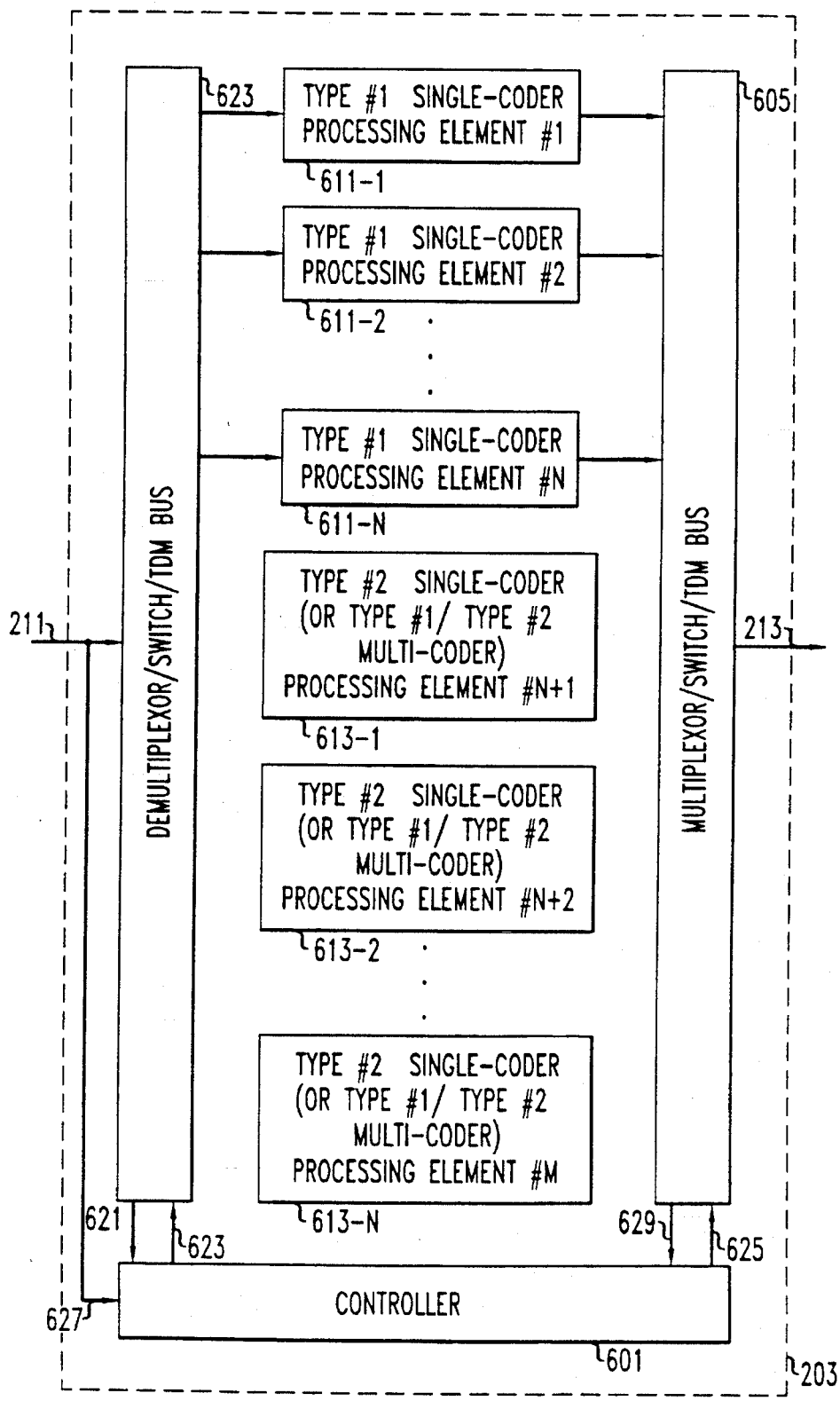
FIG. 6 depicts a block diagram of the architecture of the exemplary embodiment.

FIG. 6 depicts a block diagram of the exemplary embodiment, which preferably comprises: input lead 211, output lead 213, controller 601, switching means 603, switching means 605, a pool of N processing elements 611-1 through 611-N, and a pool of M processing elements 613-1 through 613-M. For pedagogical reasons, the signal flow is shown going in one direction only (i.e., half-duplex operation). It will be clear to those skilled in the art that embodiments of the present invention with a full-duplex architecture can be designed based on the disclosure of the present invention. For example, a full duplex architecture could be based on a combination of the half-duplex architecture and the mirror image of the half-duplex architecture, but with the relevant signaling information coming from either one or both of the mobile switching center and base station controller.

An overview of the operation of the exemplary embodiment is as follows. Switching means 603 takes the multiplexed communication signals from input lead 211, segregates and routes them, under the direction of controller 601, to the various processing elements. Each processing element transcodes the communication signal routed to it in accordance with the coding technique associated with that processing element. Each processing element then passes the transcoded communication signals to switching means 605, which re-multiplexes them for transmission to the base station controller over output lead 213.

In the exemplary embodiment, input lead 211 is preferably capable of transporting a plurality of communication signals (e.g., half-duplex audio, video or data signals), each of which is to be transcoded in accordance with a particular coding technique. For the purposes of this specification, the term "transcoding" is defined to include encoding and/or decoding with respect to data compression, cryptography and/or error detection and correction. For example, embodiments of the present invention that are used for audio compression, video decryption or data error correction are all examples of transcoded communication signals.

The communication signals on input lead 211 are preferably multiplexed either in a time division multiplexed fashion (e.g., as channels or sub-channels on an E-1 or DS-1 circuit) or as a cell stream (e.g., as part of an Asynchronous Transfer Mode, Frame Relay or other packet-based network such as in a CDMA system).

Either the source or destination device (e.g., the mobile switching center or base station controller) communicates to the illustrative embodiment which communication signals are to be transcoded with which coding technique with either: (1) in-band signaling that is carried by input lead 211 is a component of the various communication signals, or (2) by out-of-band signaling that can be carried to the exemplary embodiment by input lead 211 or by an alternative route.

When in-band signaling is used, controller 601 can learn of the signaling information in either of two ways. First, controller 601 can simply monitor all of the communications signals itself with a tap (e. g., lead 627) on the incoming signal stream. Alternatively, each processing element can decode the in-band signaling for those communications signals that it is transcoding and then send the signaling information to controller 601 via any well known mechanism (not shown). When out-of-band signaling is used, it is preferred that switching means 603 segregate the signaling information and deliver it to controller via lead 621, respectively.

In the exemplary embodiment, each of processing elements 611-1 through 611-N, and 613-1 through 613-M is preferably an identical, distinct digital signal processor. It is preferred that each of processing elements 611-1 through 611-N be configured as single-coder processing elements that exclusively perform one coding technique, hereinafter referred to as the "GSM full rate" technique. It is also preferred that each of processing elements 613-1 through 613-M be configured as single-coder processing elements that exclusively perform an alternative coding technique, hereinafter referred to as the "GSM half rate" technique. In some embodiments, it may be advantageous for each of processing elements 613-1 through 613-M to be configured to perform both half rate and full rate coding techniques.

It should be understood that although each of the processing elements is preferably configured as a "single-coder," that does not imply that each processing element can only transcode one communication signal concurrently. In the exemplary embodiment, the communication signals represent speech and the full rate coding technique transcodes 64 kbps pulse code modulation to (or from) a 16 kbps signal. In contrast, the half rate coding technique transcodes 64 kbps pulse code modulation to (or from) an 8 kbps signal. Empirically, the half rate technique is four times as computationally intense as the full rate technique, and, therefore, it is preferred that each of processing elements 611-1 through 611-N be capable of transcoding four times as many communication signals with the full rate technique as each of processing elements 613-1 through 613-M are capable of transcoding with the half rate technique.

Controller 601 preferably learns, via the in-band or out-of-band signaling described above, which of the incoming communications signals is to be transcoded with the full rate technique and then directs switching means 603 to route those signals into those processing elements 611-1 through 611-N that have the spare capacity to transcode those signals. Analogously, controller 601 also preferably learns, via the in-band or out-of-band signaling, which of the incoming communication signals is to be transcoded with the half-rate technique and then directs switching means 603 to route those signals into those processing elements 613-1 through 613-M that have the spare capacity to transcode those signals.

In the exemplary embodiment, because a communication signal can alternate between requiring the full rate technique and the half rate technique, controller 601 is preferably capable of redirecting the communication signal from one of the half-rate coders to a full-rate coder, and vice-versa.

Furthermore, when the computational complexity of the half-rate coder is significantly greater than that of the full-rate coder, it is preferred that the illustrative embodiment comprise fewer processing elements 611 than processing elements 613. It is also preferred that controller 601 treat both processing elements 611-1 through 611-N and processing elements 613-1 through 613-M as resource pools and be capable of dynamically assigning any of the incoming communications signals to any of processing elements. Typically, this requires that controller 601 maintain a table of which processing elements have spare capacity and which are partially or fully engaged transcoding one or more communications signals.

Switching means 603 can comprise either demultiplexers, switches, time division buses or any other technique that is capable of dynamically routing, under the direction of controller 601, one or more of the incoming communication signals to any of the processing elements. Because the transcoder architectures in the prior art do not enable one or more of the incoming signals to be routed to any of the processing elements in the transcoder bank, the transcoder bank in the prior art cannot be considered to be truly pooling the various processing elements, or capable of taking advantage through pooling techniques all of the inherent processing power in the transcoder bank.

Figure 1:
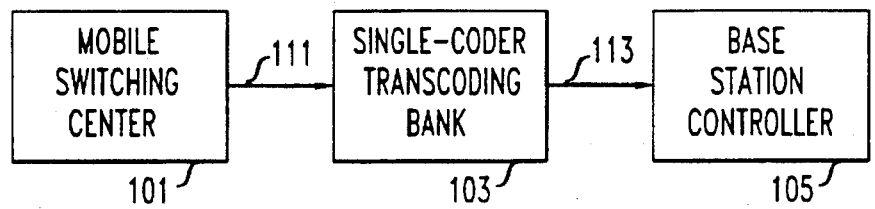
FIG. 1 depicts the architecture of a single-coder transcoding bank that is interposed between a mobile switching center and a base station controller in the prior art.
Figure 2:
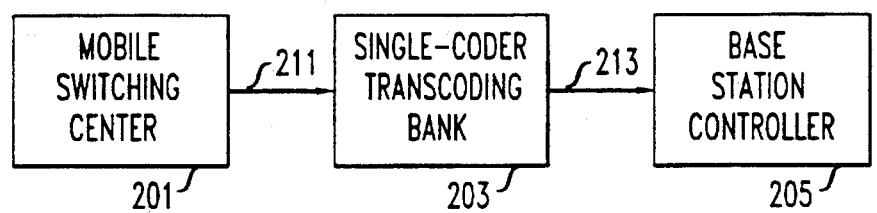
FIG. 2 depicts the architecture of a multi-coder transcoding bank that is interposed between a mobile switching center and a base station controller in the prior art.
Figure 4:
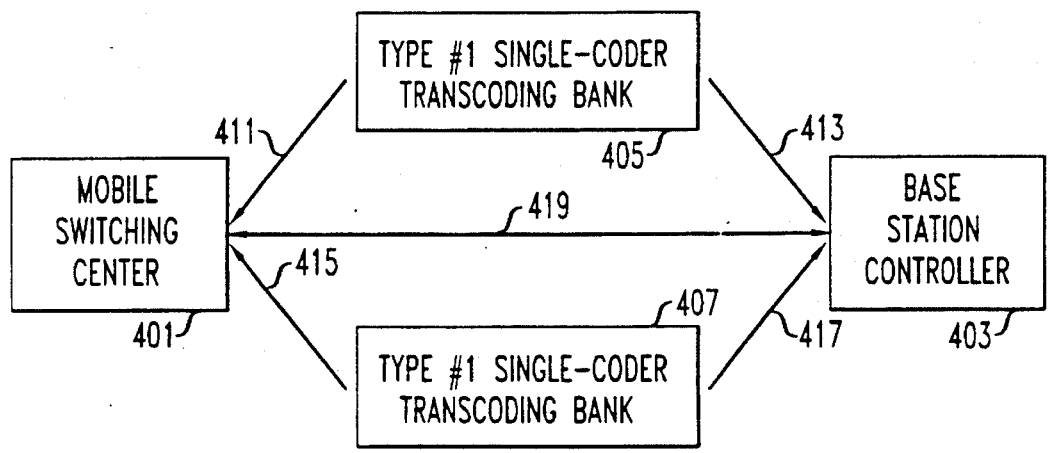
FIG. 4 depicts the architecture of a multiple, single-coder transcoding banks that are interposed between a mobile switching center and a base station controller in the prior art.
Figure 3:
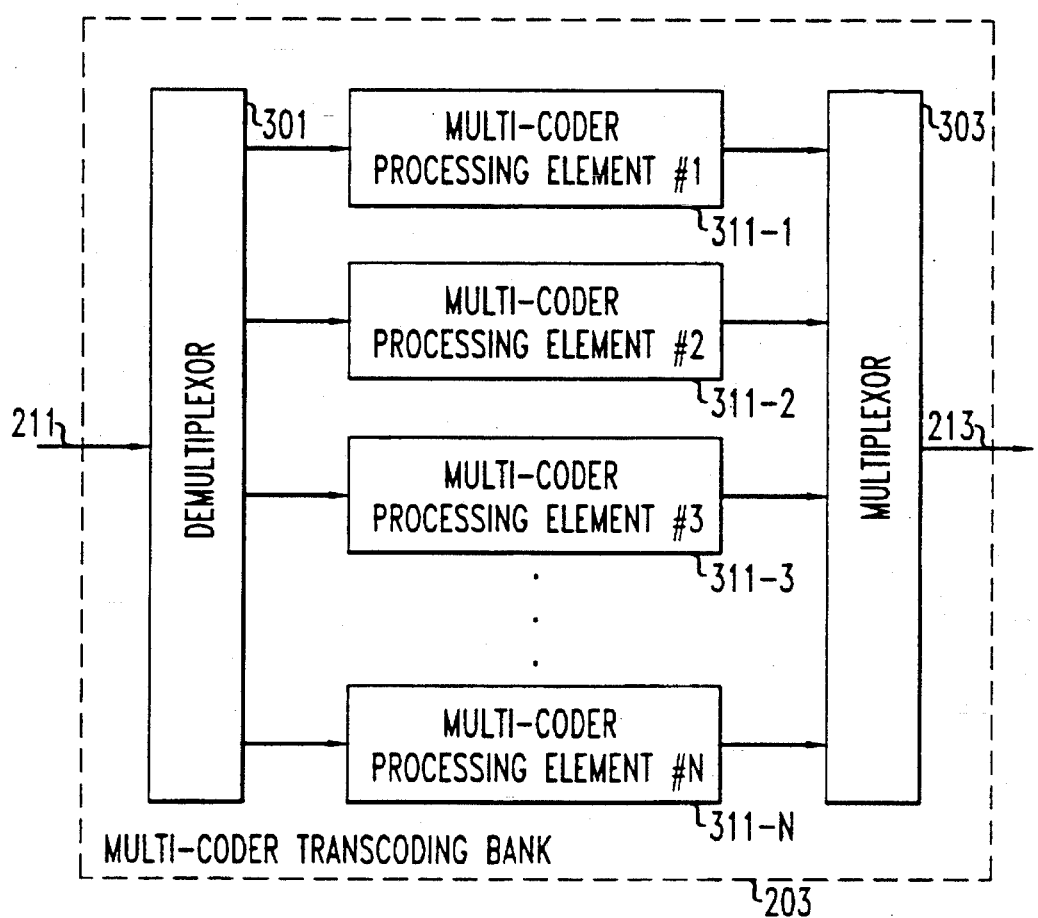
FIG. 3 depicts the detailed architecture of the multi-coder transcoding bank shown in FIG. 2.
Figure 5:
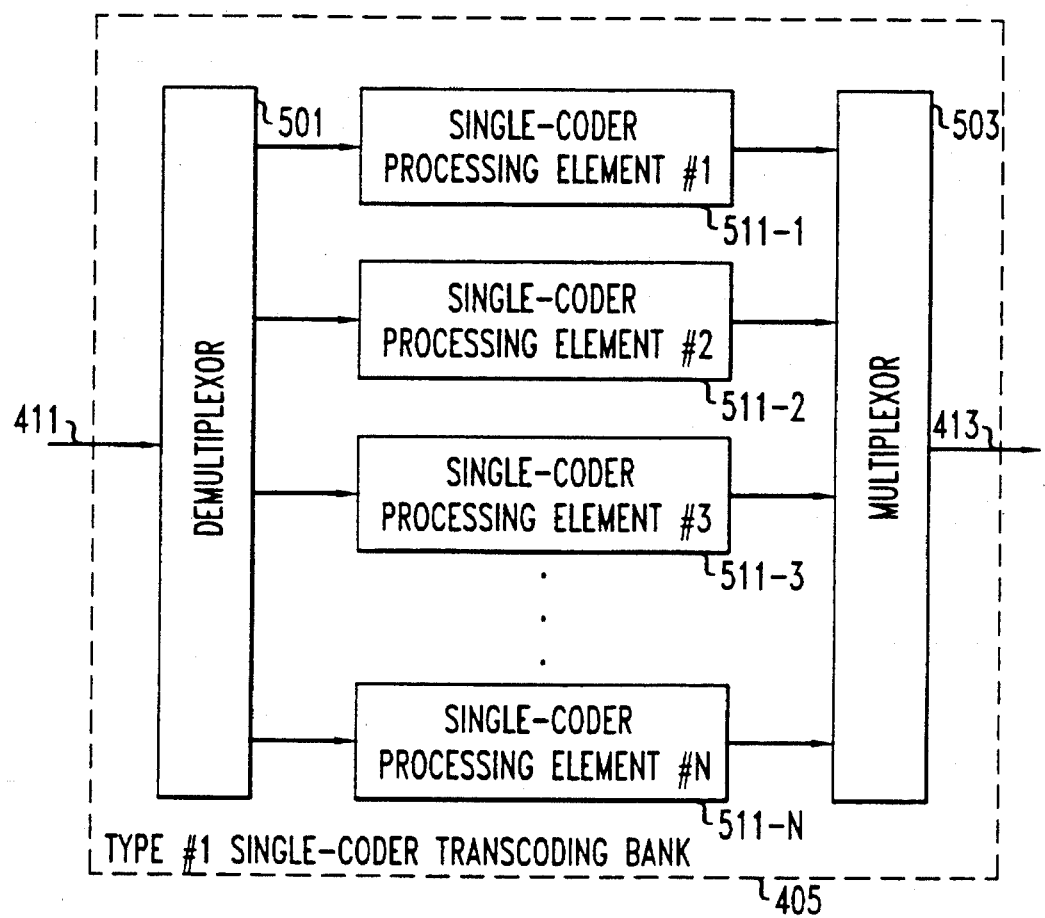
FIG. 5 depicts the detailed architecture of one of the single-coder transcoding banks shown in FIG. 4.

Analogously, switching means 605 can comprise either multiplexors, switch matrices, time division buses or any other technique that is capable of dynamically re-multiplexing, under the direction of controller 601, the transcoded signals from the respective processing elements onto output lead 213. In other words, the function of switching means 605 is advantageously to perform the inverse function of switching means 603. It will be clear to those skilled in the art that switching means 603 can be the same physical device as switching means 605, particularly where time division switching is employed. The segregating and desegregating functions performed by switching means 603 and switching means 605 are dynamic and, therefore, typically more complex than the static demultiplexing and multiplexing operations performed in the transcoder banks in FIG. 3 and FIG. 5.

What is claimed is:

1. An apparatus comprising:

an input lead capable of transporting a plurality of multiplexed communication signals;

an output lead capable of transporting a plurality of multiplexed transcoded communication signals;

a first processing element that is configured to perform a first coding technique on at least one communication signal to produce one transcoded communication signal for each communication signal;

a second processing element that is configured to perform said first coding technique on at least one communication signal to produce one transcoded communication signal for each communication signal;

a third processing element that is configured to perform a second coding technique on at least one communication signal to produce one transcoded communication signal for each communication signal;

a fourth processing element that is configured to perform said second coding technique on at least one communication signal to produce one transcoded communication signal for each communication signal;

a controller;

first switching means for receiving said plurality of multiplexed communications signals, for segregating said plurality of multiplexed communications signals and for routing, under the direction of said controller, one or more of said communications signals to any of said first processing element, said second processing element, said third processing element and said fourth processing element; and second switching means for receiving each of said transcoded communications signals, for desegregating said transcoded communications signals to form said plurality of multiplexed transcoded communications signals, and for transmitting said plurality of multiplexed transcoded communications signals on said output lead.

2. The apparatus of claim 1 wherein said input lead is further capable of transporting an in-band signal that indicates whether a first communication signal is to be transcoded with said first coding technique or said second coding technique.

3. The apparatus of claim 2 further comprising a controller for receiving said in-band signal and controlling, based on whether said first communication signal is to be transcoded with said first coding technique or said second coding technique, to which processing element said first switching means routes said first communication signal.

4. The apparatus of claim of 1 further comprising an out-of-band signaling channel that indicates whether a first communication signal is to be transcoded with said first coding technique or said second coding technique.

5. The apparatus of claim 4 further comprising a controller for receiving said out-of-band signaling channel and for controlling, based on whether said first communication signal is to be transcoded with said first coding technique or said second coding technique, to which processing element said first switching means routes said first communication signal.

6. An apparatus comprising:

an input lead capable of transporting a first communication signal, a second communication signal, a third communication signal, a fourth communication signal, a fifth communication signal, and a sixth communication signal, such that said first communication signal, said second communication signal, said third communication signal and said fourth communication signal are to be transcoded with a first coding technique, and said fifth communication signal and said sixth communication signal are to be transcoded with an second coding technique;

an output lead capable of transporting a first transcoded communication signal, a second transcoded communication signal, a third transcoded communication signal, a fourth transcoded communication signal, a fifth transcoded communication signal and a sixth transcoded communication signal;

a first processing element for receiving said first communication signal and said second communication signal, for transcoding said first communication signal with said first coding technique to produce said first transcoded communication signal, and for transcoding said second communication signal with said first coding technique to produce said second transcoded communication signal;

a second processing element for receiving said third communication signal and said fourth communication signal, for transcoding said third communication signal with said first coding technique to produce said third transcoded communication signal, and for transcoding said fourth communication signal with said first coding technique to produce said fourth transcoded communication signal;

a third processing element for receiving said fifth communication signal and for transcoding said fifth communication signal with said second coding technique to produce said fifth transcoded communication signal;

a fourth processing element for receiving said sixth communication signal and for transcoding said sixth communication signal with said second coding technique to produce said sixth transcoded communication signal;

first switching means, connected to said input lead, for segregating said first communication signal, said second communication signal, said third communication signal, said fourth communication signal, said fifth communication signal, and said sixth communication signal from said input lead, and for routing said first communication signal and said second communication signal to said first processing element said third communication signal and said fourth communication signal to said second processing element, said fifth communication signal to said third processing element and said sixth communication signal to said fourth processing element; and second switching means, connected to said output lead, for receiving said first transcoded communication signal and said second transcoded communication signal from said first processing element, said third transcoded communication signal and said fourth transcoded communication signal from said second processing element, said fifth transcoded communication signal from said third processing element, and said sixth transcoded communication signal from said fourth processing element, and for integrating said first transcoded communication signal, said second transcoded communication signal, said third transcoded communication signal, said fourth transcoded communication signal, said fifth transcoded communication signal, and said sixth transcoded communication signal for transmission on said output lead.

7. The apparatus of claim 6 wherein said input lead is further capable of transporting an in-band signal that indicates whether said first communication signal is to be transcoded with said first coding technique or said second coding technique.

8. The apparatus of claim 7 further comprising a controller for receiving said in-band signal and controlling, based on whether said first communication signal is to be transcoded with said first coding technique or said second coding technique, to which processing element said first switching means routes said first communication signal.

9. The apparatus of claim of 6 further comprising an out-of-band signaling channel that indicates whether said first communication signal is to be transcoded with said first coding technique or said second coding technique.

10. The apparatus of claim 9 further comprising a controller for receiving said out-of-band signaling channel and for controlling, based on whether said first communication signal is to be transcoded with said first coding technique or said second coding technique, to which processing element said first switching means routes said first communication signal.

11. An apparatus comprising:

an input lead capable of transporting a first communication signal, a second communication signal, a third communication signal, and a fourth communication signal, such that said first communication signal and said second communication signal are to be transcoded with a first coding technique, and said third communication signal and said fourth communication signal are to be transcoded with a second coding technique;

an output lead capable of transporting a first transcoded communication signal, a second transcoded communication signal, a third transcoded communication signal, and a fourth transcoded communication signal;

a first processing element, which is configured to perform said first coding technique only, for receiving said first communication signal and for transcoding said first communication signal with said first coding technique to produce said first transcoded communication signal;

a second processing element, which is configured to perform said first coding technique only, for receiving said second communication signal and for transcoding said second communication signal with said first coding technique to produce said second transcoded communication signal;

a third processing element for receiving said third communication signal and for transcoding said third communication signal with said second coding technique to produce said third transcoded communication signal;

a fourth processing element for receiving said fourth communication signal and for transcoding said fourth communication signal with said second coding technique to produce said fourth transcoded communication signal;

first switching means for receiving said first communication signal, said second communication signal, said third communication signal, and said fourth communication signal from said input lead, for segregating said first communication signal, said second communication signal, said third communication signal, and said fourth communication signal, and for routing, based on the coding technique to be applied to each communication signal, said first communication signal to said first processing element, said second communication signal to said second processing element, said third communication signal to said third processing element and said fourth communication signal to said fourth processing element; and second switching means for receiving said first transcoded communication signal from said first processing element, said second transcoded communication signal from said second processing element, said third transcoded communication signal from said third processing element, and said fourth transcoded communication signal from said fourth processing element, and for integrating said first transcoded communication signal, said second transcoded communication signal, said third transcoded communication signal and said fourth transcoded communication signal for transmission on said output lead.

12. A system comprising:

a mobile switching center for transmitting onto an input lead a plurality of multiplexed communications signals, each of which is to be transcoded according to a given coding technique;

a base station controller for receiving from an output lead a plurality of multiplexed transcoded communications signals;

a first processing element that is configured to perform a first coding technique on a communication signal to produce a transcoded communication signal;

a second processing element that is configured to perform a first coding technique on a communication signal to produce a transcoded communication signal;

a third processing element that is configured to perform a second coding technique on a communication signal to produce a transcoded communication signal;

a fourth processing element that is configured to perform a second coding technique on a communication signal to produce a transcoded communication signal;

a controller;

first switching means for receiving said plurality of multiplexed communications signals, for segregating said communications signals and that is capable of routing, under the direction of said controller, one or more of said communications signals to any of said first processing element, said second processing element, said third processing element and said fourth processing element; and second switching means for receiving said transcoded communication signals from said processing elements, for multiplexing said transcoded communication signals and for transmitting said transcoded communications signals to said base station controller on said output lead.

* * * * *